US012700597B2

(12) United States Patent
Kim et al.

(10) Patent No.: US 12,700,597 B2
(45) Date of Patent: Aug. 4, 2026

(54) STAINLESS STEEL HAVING EXCELLENT SURFACE ELECTRICAL CONDUCTIVITY FOR FUEL CELL SEPARATOR AND MANUFACTURING METHOD THEREFOR

(71) Applicant: POSCO, Pohang-si (KR)

(72) Inventors: Jong-hee Kim, Daejeon (KR); Bo-sung Seo, Pohang-si (KR); Kwangmin Kim, Pohang-si (KR); Youngjun Kim, Pohang-si (KR)

(73) Assignee: POSCO, Pohang-si (KR)

( * ) Notice: Subject to any disclaimer, the term of this patent is extended or adjusted under 35 U.S.C. 154(b) by 711 days.

(21) Appl. No.: 17/786,509

(22) PCT Filed: Oct. 16, 2020

(86) PCT No.: PCT/KR2020/014197
§ 371 (c)(1),
(2) Date: Jun. 16, 2022

(87) PCT Pub. No.: WO2021/125531
PCT Pub. Date: Jun. 24, 2021

(65) Prior Publication Data
US 2023/0043454 A1 Feb. 9, 2023

(30) Foreign Application Priority Data
Dec. 19, 2019 (KR) ......................... 10-2019-0170587

(51) Int. Cl.
*H01M 8/021* (2016.01)

(52) U.S. Cl.
CPC .................................... *H01M 8/021* (2013.01)

(58) Field of Classification Search
CPC ......... H01M 8/021; H01M 2008/1095; H01M 8/0206; H01M 8/0215; H01M 8/0228;
(Continued)

(56) References Cited

U.S. PATENT DOCUMENTS 11,923,580 B2 3/2024 Kim et al.
2018/0219201 A1* 8/2018 Kim .......................... C25F 5/00

FOREIGN PATENT DOCUMENTS

CN 107925040 A 4/2018
JP 2004-149920 A 5/2004
(Continued)

OTHER PUBLICATIONS

Japanee Office Action dated Jul. 4, 2023 issued in Japanese Patent Application No. 2022-538105 (with English translation).
(Continued)

*Primary Examiner* — Daniel S Gatewood
(74) *Attorney, Agent, or Firm* — Morgan Lewis & Bockius LLP

(57) ABSTRACT

A stainless steel a fuel cell separator including a surface oxide layer having a bandgap energy of 2 eV or less. A value of the surface oxide atomic ratio ((sum of atomic concentrations of metal elements in metal oxide (MO)/(sum of atomic concentrations of metal elements in total oxides and hydroxides))) is 0.44 or less, as measured on the surface of a stainless steel containing 15 wt % or more of Cr by X-ray angle-resolved photoemission spectroscopy using an Al-Kα X-ray source under the condition where a take-off angle of photoelectrons is from 12° to 85°. The metal oxide (MO) includes a mixed oxide: M represents an alloying element other than Cr and Fe or a combination thereof in the matrix; and O represents oxygen; and the total oxides and hydroxides include a Cr oxide, a Cr hydroxide, an Fe oxide, an Fe hydroxide, and the metal oxide (MO).

6 Claims, 1 Drawing Sheet

VALUE OF SURFACE OXIDE ATOMIC RATIO (1)

(58) Field of Classification Search
CPC ..... C22C 38/001; C22C 38/004; C22C 38/04;
C22C 38/22; C22C 38/24; C22C 38/26;
C22C 38/28; C22C 38/38; C22C 38/42;
C22C 38/44; C22C 38/50; C22C 38/58;
C22C 38/02; C23G 1/081; Y02E 60/50;
Y02P 70/50; C23C 22/50; C25F 1/00
See application file for complete search history.

(56) References Cited

FOREIGN PATENT DOCUMENTS

| | | | |
|---|---|---|---|
| JP | 2008-091225 | A | 4/2008 |
| JP | 2010-514930 | A | 5/2010 |
| JP | 2010-138487 | A | 6/2010 |
| JP | 2018-534416 | A | 11/2018 |
| JP | 2019-178412 | A | 10/2019 |
| KR | 10-0777123 | B1 | 11/2007 |
| KR | 10-0844023 | B1 | 7/2008 |
| KR | 10-2015-0074768 | A | 7/2015 |
| KR | 10-1588093 | B | 1/2016 |
| KR | 10-2017-0035374 | A | 3/2017 |
| KR | 10-2018-0107050 | A | 10/2018 |
| KR | 1020180107050 | * | 10/2018 |

OTHER PUBLICATIONS

Indian Office Action dated Nov. 11, 2022 issued in Indian Patent Application No. 202217036970 (with English translation).
Extended European Search Report dated Dec. 23, 2022 issued in European Patent Application No. 20901948.8.
Supplemental European Search Report dated Jan. 11, 2023 issued in European Patent Application No. 20901948.8.
International Search Report issued in corresponding International Patent Application No. PCT/KR2020/014197 dated Mar. 22, 2021.
Office Action issued in corresponding Korean Patent Application No. 10-2019-0170587 dated Mar. 9, 2021.
Chinese Office Action dated Apr. 19, 2024 issued in Chinese Patent Application No. 202080093017.X (with English translation).
Communication under Rule 71(3) dated Feb. 25, 2025 issued in European Patent Application No. 20901948.8.
European Communication dated Jun. 26, 2025 issued in European Patent Application No. 20901948.8.

* cited by examiner

【FIG. 1A】
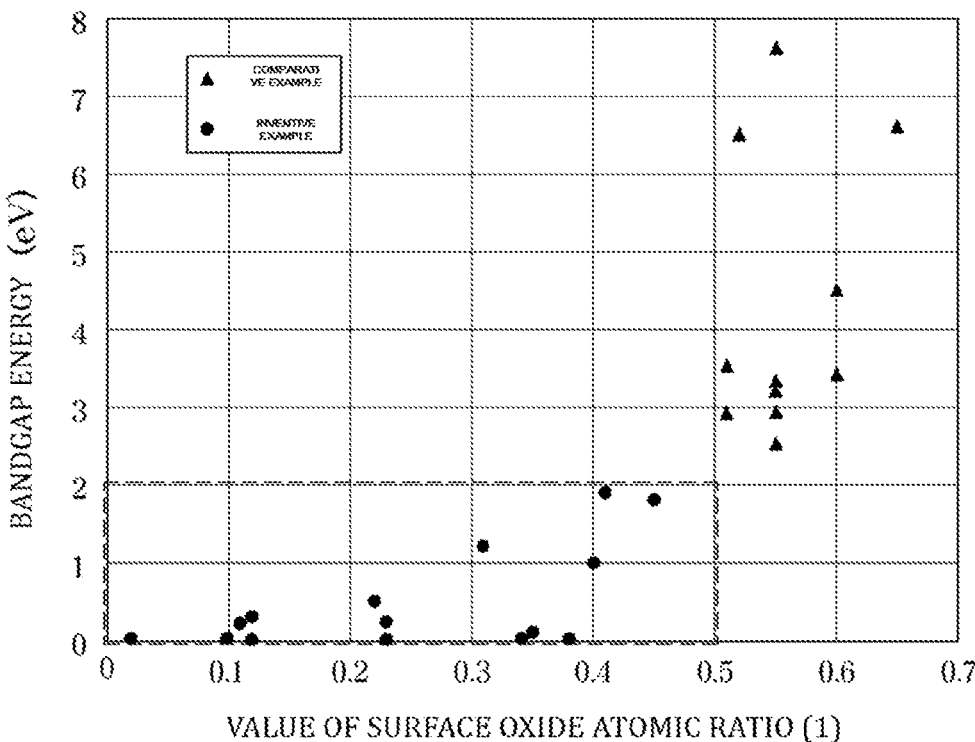
VALUE OF SURFACE OXIDE ATOMIC RATIO (1)
【FIG. 1B】
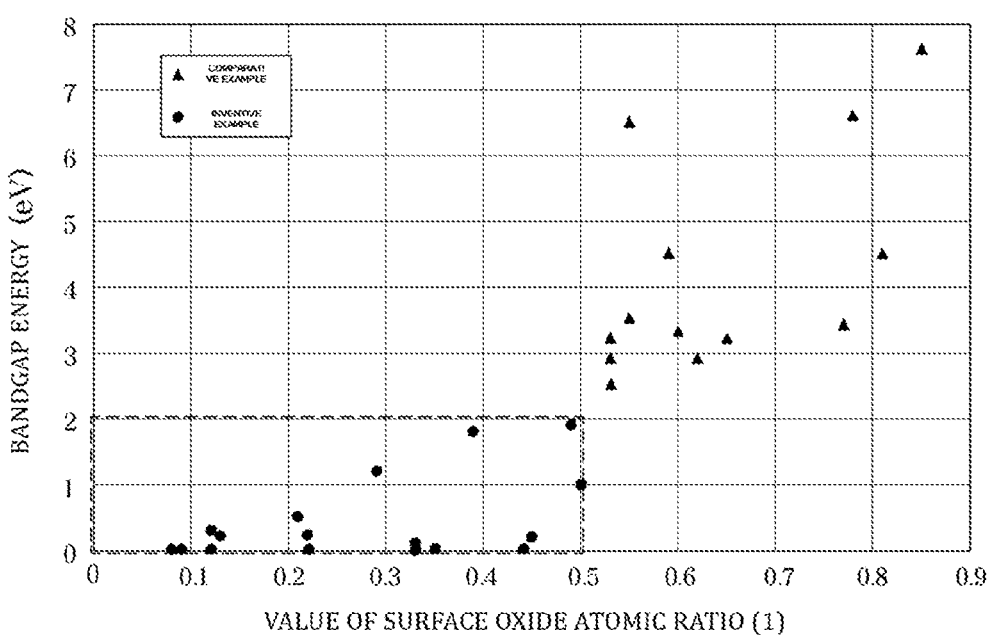
VALUE OF SURFACE OXIDE ATOMIC RATIO (1)

STAINLESS STEEL HAVING EXCELLENT SURFACE ELECTRICAL CONDUCTIVITY FOR FUEL CELL SEPARATOR AND MANUFACTURING METHOD THEREFOR

CROSS REFERENCE

This application is the U.S. National Phase under 35 U.S.C. § 371 of International Application No. PCT/KR2020/014197 filed on Oct. 16, 2020, which claims the benefit of Korean Patent Application No. 10-2019-0170587 filed on Dec. 19, 2019, the entire contents of each are hereby incorporated by reference.

TECHNICAL FIELD

The present disclosure relates to a stainless steel having excellent surface electrical conductivity and a manufacturing method therefor, and more particularly, to a stainless steel having excellent surface electrical conductivity for a fuel cell separator and a manufacturing method therefor.

BACKGROUND ART

Due to excellent corrosion resistance and ease of processing, stainless steels have been considered as materials for electronic parts and fuel cell separators. However, conventional stainless steels have a problem of insufficient electric conductivity because a passivated layer formed on the surface serves as a through-plane resistance factor.

The mechanism of the effect of a passivated layer on surface electrical conductivity of a stainless steel has not been clearly identified to date. Ni plating may be conducted for materials for electronic parts to enhance surface electrical conductivity of such a passivated layer, or a process of coating a conductive material such as gold, carbon, and a nitride on the surface of a stainless steel has been proposed to reduce high contact resistance of the stainless steel for fuel cell separators. However, there are a problem in that manufacturing costs and time increase due to an additional process for the Ni plating or the coating with other coating materials, thereby deteriorating productivity, and a problem in that fundamental through-plane resistance of a passivated layer cannot be reduced.

In addition, as another method for improving surface electrical conductivity of a stainless steel, a method of refining the surface of the stainless steel has been attempted.

Patent Document 1 discloses a stainless steel having a low interface contact resistance and high corrosion potential for a separator by controlling a surface refining process.

Patent Document 2 discloses a method for manufacturing a stainless steel having excellent corrosion resistance and low contact resistance by immersing a stainless steel including 17 to 23 wt % of Cr in a [HF]≥[HNO₃] solution.

Patent Document 3 discloses a stainless steel including 15 to 45 wt % of Cr and 0.1 to 5 wt % of Mo, wherein an atomic ratio of Cr to Fe contained in a passivated layer of the stainless steel is 1 or more.

However, the methods disclosed in Patent Documents 1 to 3 have limitations because fundamental through-plane resistance of the passivated layer of a stainless steel cannot be lowered by only controlling the Cr/Fe atomic ratio of the passivated layer within a several nm region.

(Patent Document 0001) Korean Patent Application Laid-open Publication No. 10-2014-0081161 (Jul. 1, 2014)

(Patent Document 0002) Korean Patent Application Laid-open Publication No. 10-2013-0099148 (Sep. 5, 2013)

(Patent Document 0003) Japanese Patent Application Laid-open Publication No. 2004-149920 (May 27, 2004)

DISCLOSURE

Technical Problem

To solve the above-described problems, provided is a stainless steel having excellent surface electrical conductivity for a fuel cell separator applicable to materials for electrical contacts and materials for fuel cell separators and a manufacturing method thereof.

Technical Solution

In accordance with an aspect of the present disclosure to achieve the above-described objects, provided is a stainless steel having excellent surface electrical conductivity for a fuel cell separator, a value of the following surface oxide atomic ratio (1) may be 0.5 or less, as measured on a surface of the stainless steel containing 15 wt % or more of Cr by X-ray angle-resolved photoemission spectroscopy using an Al-Kα X-ray source under the condition where a take-off angle of photoelectrons is from 12° to 85°.

$$\frac{\text{sum of atomic concentrations (at\%)}}{\text{of metal elements in metal oxide (MO)}} \quad (1)$$
$$\frac{}{\begin{array}{c}\text{sum of atomic concentrations (at\%)}\\ \text{of metal elements in total oxides and hydroxides}\end{array}}$$

The metal oxide (MO) includes a mixed oxide: M represents an alloying element other than Cr and Fe or a combination thereof in the matrix; and O represents oxygen. The total oxides and hydroxides include a Cr oxide, a Cr hydroxide, an Fe oxide, an Fe hydroxide, and the metal oxide (MO).

In the stainless steel having excellent surface electrical conductivity for a fuel cell separator of the present disclosure, the value of the surface oxide atomic ratio (1) may be 0.44 or less.

In the stainless steel having excellent surface electrical conductivity for a fuel cell separator of the present disclosure, a bandgap energy of a surface oxide layer of the stainless steel may be 2 eV or less.

In the stainless steel having excellent surface electrical conductivity for a fuel cell separator of the present disclosure, the surface oxide layer of the stainless steel may form an ohmic contact with the matrix.

In accordance with another aspect of the present disclosure to achieve the above-described objects, provided is a method for manufacturing a stainless steel for fuel cell separators with excellent electrical conductivity, the method including a primary surface treatment performing by immersing a cold-rolled stainless steel sheet in a nonoxidizing acid solution or conducting an electrolytic treatment after the immersing, and a secondary surface treatment performed by immersing the cold-rolled stainless steel sheet in an oxidizing acid solution, wherein a value of the following surface oxide atomic ratio (1) may be 0.5 or less, as measured on a surface of the stainless steel containing 15 wt % or more of Cr by X-ray angle-resolved photoemission spectroscopy using an Al-Kα X-ray source under the condition where a take-off angle of photoelectrons is from 12° to 85°.

$$\frac{\text{sum of atomic concentrations (at \%)}}{\text{of metal elements in metal oxide (MO)}} \quad (1)$$
$$\overline{\text{sum of atomic concentrations (at \%)}}$$
$$\text{of metal elements in total oxides and hydroxides}$$

The metal oxide (MO) includes a mixed oxide: M represents an alloying element other than Cr and Fe or a combination thereof in the matrix; and O represents oxygen. The total oxides and hydroxides include a Cr oxide, a Cr hydroxide, an Fe oxide, an Fe hydroxide, and the metal oxide (MO).

In the method for manufacturing the stainless steel having excellent surface electrical conductivity for fuel cell separators, the primary surface treatment is performed by immersing a cold-rolled stainless steel sheet in a nonoxidizing acid solution for 5 seconds or more, or performing an electrolytic treatment at a current density of $0.1 \text{ A/cm}^2$ or more for 5 seconds or more after the immersing, and the nonoxidizing acid solution may be a 5 wt % or more hydrochloric acid or sulfuric acid solution at 50° C. or higher.

In the method for manufacturing the stainless steel having excellent surface electrical conductivity for fuel cell separators, the secondary surface treatment includes immersing the cold-rolled stainless steel sheet in the oxidizing acid solution for 5 seconds or more, and the oxidizing acid solution may be a 5 wt % or more nitric acid solution at 50° C. or higher.

Advantageous Effects

The present disclosure may provide a stainless steel having excellent surface electrical conductivity for a fuel cell separator applicable to materials for electrical contacts and materials for fuel cell separators by making a surface oxide layer, which is formed on the surface of the stainless steel and has semiconductor characteristics, into a conductor, and a manufacturing method thereof.

The present disclosure may also provide a stainless steel having excellent surface electrical conductivity for a fuel cell separator and having a bandgap energy of a surface oxide layer of 2 eV or less by controlling a value of the following surface oxide atomic ratio (1) to 0.5 or less, as measured on the surface of the stainless steel by X-ray angle-resolved photoemission spectroscopy using an Al-Kα X-ray source under the condition where a take-off angle of photoelectrons is from 12° to 85°.

$$\frac{\text{sum of atomic concentrations (at \%)}}{\text{of metal elements in metal oxide (MO)}} \quad (1)$$
$$\overline{\text{sum of atomic concentrations (at \%)}}$$
$$\text{of metal elements in total oxides and hydroxides}$$

The metal oxide (MO) includes a mixed oxide: M represents an alloying element other than Cr and Fe or a combination thereof in a matrix; and O represents oxygen. The total oxides and hydroxides include a Cr oxide, a Cr hydroxide, an Fe oxide, an Fe hydroxide, and the metal oxide (MO).

According to the present disclosure, the surface oxide layer of the stainless steel may form an ohmic contact with the matrix, thereby providing a stainless steel having excellent surface electrical conductivity for fuel cell separators.

DESCRIPTION OF DRAWINGS

FIGS. 1A and 1B are graphs illustrating relationship between bandgap energy and surface oxide atomic ratio (1) with reference to the results of Table 2.

BEST MODE

Provided is a stainless steel having excellent surface electrical conductivity for a fuel cell separator, wherein a value of the following surface oxide atomic ratio (1) may be 0.5 or less, as measured on the surface of a stainless steel containing 15 wt % or more of Cr by X-ray angle-resolved photoemission spectroscopy using an Al-Kα X-ray source under the condition where a take-off angle of photoelectrons is from 12° to 85°.

$$\frac{\text{sum of atomic concentrations (at \%)}}{\text{of metal elements in metal oxide (MO)}} \quad (1)$$
$$\overline{\text{sum of atomic concentrations (at \%)}}$$
$$\text{of metal elements in total oxides and hydroxides}$$

The metal oxide (MO) includes a mixed oxide: M represents an alloying element other than Cr and Fe or a combination thereof in the matrix; and O represents oxygen. The total oxides and hydroxides include a Cr oxide, a Cr hydroxide, an Fe oxide, an Fe hydroxide, and the metal oxide (MO).

MODES OF THE INVENTION

Hereinafter, embodiments of the present disclosure will be described in detail with reference to the accompanying drawings. The embodiments of the present disclosure may, however, be embodied in many different forms and should not be construed as being limited to the embodiments set forth herein. Rather, these embodiments are provided so that this disclosure will be thorough and complete, and will fully convey the concept of the invention to those skilled in the art.

Also, the terms used herein are merely used to describe particular embodiments. An expression used in the singular encompasses the expression of the plural, unless otherwise indicated. Throughout the specification, the terms such as "including" or "having" are intended to indicate the existence of features, operations, functions, components, or combinations thereof disclosed in the specification, and are not intended to preclude the possibility that one or more other features, operations, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

The terms "about", "substantially", etc. used throughout the specification means that when a natural manufacturing and a substance allowable error are suggested, such an allowable error corresponds the value or is similar to the value, and such values are intended for the sake of clear understanding of the present invention or to prevent an unconscious infringer from illegally using the disclosure of the present invention.

Also, as used herein, the term "cold-rolled stainless steel sheet" refers to a cold-rolled stainless steel sheet manufactured by a common manufacturing method for stainless steels including hot rolling-heating-cold rolling-annealing and may be interpreted as a cold-rolled stainless steel sheet manufactured by a common method for manufacturing cold-rolled stainless steel sheets within a range clearly recognized by those skilled in the art.

Also, as used herein, the term "surface oxide" refers to an oxide formed on the surface of a stainless steel as a result of spontaneous oxidization of metal element contained in the matrix by external oxygen in the case where the stainless steel is exposed to a temperature of about 200° C. or below. The surface oxide may include $Cr_2O_3$ as a main element and may include $SiO_2$, $SiO$, $Si_2O_3$, $MnO$, $MnO_2$, $Mn_2O_3$, $VO$, $V_2O_3$, $V_2O_5$, $NbO$, $NbO_2$, $Nb_2O_5$, $TiO_2$, $FeO$, $Fe_2O_3$, and $Fe_3O_4$. Although examples of the surface oxide are given above, it is to be noted that these examples are made only for illustrative purposes, and the present disclosure is not to be construed as being limited to those examples.

Also, as used herein, the term "surface oxide layer" refers to a layer including a surface oxide according to the present disclosure and may also be interpreted as a passivated layer of a stainless steel.

Also, as used herein, the "Fe oxide" refers to any Fe oxide in the form of an oxide of Fe within a range that may be clearly recognized by those of ordinary skill in the art such as $FeO$, $Fe_2O_3$, and $Fe_3O_4$. The "Fe hydroxide" refers to any Fe hydroxide in the form of a hydroxide of Fe within a range that may be clearly recognized by those of ordinary skill in that art such as $FeOOH$, $Fe(OH)_2$—, and $Fe(OH)_3$.

Also, as used herein, the "Cr oxide" refers to any Cr oxide in the form of an oxide of Cr within a range that may be clearly recognized by those of ordinary skill in the art such as $Cr_3O_4$, $Cr_2O_3$, $CrO_2$, and $CrO_3$. The "Cr hydroxide" refers to any Cr hydroxide in the form of a hydroxide of Cr within a range that may be clearly recognized by those of ordinary skill in that art such as $CrOOH$, $Cr(OH)_2$, and $Cr(OH)_3$.

It is known that a passivated layer of conventional stainless steels has a high resistance due to semiconductor properties of an oxide. The present inventors have developed a stainless steel having excellent surface electrical conductivity for a fuel cell separator applicable to materials for electrical contacts and fuel cell separators by making a surface oxide layer having semiconductor properties into a conductor by controlling a bandgap energy of the surface oxide layer to 2 eV or less.

According to an embodiment of the present disclosure, a value of the following surface oxide atomic ratio (1) may be 0.5 or less, as measured on the surface of the stainless steel by X-ray angle-resolved photoemission spectroscopy (ARPES) using an Al-Kα X-ray source under the condition where a take-off angle of photoelectrons is from 12° to 85°.

$$\frac{\text{sum of atomic concentrations (at\%)}}{\text{of metal elements in metal oxide (MO)}}{\frac{}{\text{sum of atomic concentrations (at\%)}}}{\text{of metal elements in total oxides and hydroxides}} \quad (1)$$

The metal oxide (MO) includes a mixed oxide, M represents an alloying element other than Cr and Fe or a combination thereof in the matrix; and O represents oxygen. The metal oxide (MO) may be, for example, $SiO_2$, $SiO$, $Si_2O_3$, $MnO$, $MnO_2$, $Mn_2O_3$, $VO$, $V_2O_3$, $V_2O_5$, $NbO$, $NbO_2$, $Nb_2O_5$, or $TiO_2$. Although examples of the metal oxide (MO) are listed above, the examples are only intended to illustrate the present disclosure in more detail and are not intended to limit the scope of the present disclosure.

The total oxides and hydroxides include a Cr oxide, a Cr hydroxide, an Fe oxide, an Fe hydroxide, and the metal oxide (MO).

Hereinafter, reasons for numerical limitations on the take-off angle of photoelectrons in the X-ray angle-resolved photoemission spectroscopy will be described, and then reasons for numerical limitations on the value of surface oxide atomic ratio (1) will be described.

In the X-ray angle-resolved photoemission spectroscopy, as the take-off angle of photoelectrons decreases, an analysis depth in a depth direction from the outermost surface of the stainless steel decreases and as the take-off angle increases, the analysis depth increases. In consideration thereof, the surface of the stainless steel may be measured by X-ray angle-resolved photoemission spectroscopy using an Al-Kα X-ray source under the condition where the take-off angle of photoelectrons is from 12° to 85° according to an embodiment to analyze the composition of the total oxides formed on the surface of the stainless steel regardless of the thickness of the stainless steel.

The reason why the value of the surface oxide atomic ratio (1) measured under the above-described conditions is limited to be 0.5 or less is that the passivated layer is a critical point for conversion from semiconductor properties into conductor properties. When the value of the surface oxide atomic ratio (1) exceeds 0.5, the passivated layer cannot have sufficient surface electrical conductivity due to the semiconductor properties, and thus the stainless steel is not suitable for fuel cell separators.

By controlling the value of the surface oxide atomic ratio (1) to 0.5 or less, the bandgap energy of the surface oxide layer may be adjusted to be 2 eV or less in the present disclosure. When the bandgap energy is 0 eV, the surface oxide layer has conductor properties. When the bandgap energy is more than 0 eV and not more than 2 eV, the surface oxide layer has intermediate properties between semiconductor properties and conductor properties, and thus the stainless steel may be suitable for fuel cell separators.

In addition, according to the present disclosure, it is preferable to control the value of the surface oxide atomic ratio (1) to 0.44 or less to adjust the bandgap energy of the surface oxide layer to 0 eV. The bandgap energy of the surface oxide layer of 0 eV means that the matrix and the surface oxide layer of the stainless steel forms a new ohmic contact, which has not been previously known, although the passivated layer consists of oxides. In other words, it means that a new conductive coating layer, in which the surface oxide layer forms an ohmic contact with the matrix of the stainless steel, is formed.

In the stainless steel having excellent surface electrical conductivity for a fuel cell separator according to the present disclosure, the bandgap energy of the surface oxide layer may be 2 eV or less, and the steel type is not particularly limited. According to an embodiment, an austenitic stainless steel, a ferritic stainless steel, and a ferritic-austenitic dual-phase stainless steel may be used as the stainless steel of the present disclosure.

In addition, the composition of alloying elements of the stainless steel for fuel cell separators having excellent electrical conductivity according to the present disclosure is not particularly limited. However, a preferred composition is as follows. However, it is necessary to note that the following composition of the alloying elements is only intended to assist understanding of the present disclosure in more detail and are not intended to limit the scope of the present disclosure.

According to an embodiment, the stainless steel according to the present disclosure may include, in percent by weight (wt %), more than 0% and not more than 0.3% of C, more than 0% and not more than 0.3% of N, more than 0% and not more than 0.7% of Si, more than 0% and not more than 10% of Mn, more than 0% and not more than 0.04% of P, more than 0% and not more than 0.02% of S, 15 to 34% of Cr, 25% or less of Ni, and the remainder of Fe and other inevitable impurities.

Hereinafter, reasons for numerical limitations on the contents of alloy components in the embodiment of the present disclosure will be described. Hereinafter, the unit is wt % unless otherwise stated.

C: more than 0% and not more than 0.3%, N: more than 0% and not more than 0.3%

C and N bind to Cr contained in a steel to form a Cr carbonitride, and thus a region in which Cr is locally depleted may be formed, thereby increasing a risk of deterioration of corrosion resistance. Therefore, it is preferable to control the contents of the two elements as low as possible. Thus, the contents of C and N are controlled in the present disclosure such that the C content is more than 0% and not more than 0.3%, and the N content is more than 0% and not more than 0.3.

Si: more than 0% and not more than 0.7%

Si is an element effective on deoxidization. However, an excess of Si may deteriorate toughness and formability, and an oxide $SiO_2$ generated during an annealing process deteriorates electrical conductivity and hydrophilicity. In consideration thereof, the Si content is controlled to be more than 0% and not more than 0.7% in the present disclosure.

Mn: more than 0% and not more than 10%

Mn is an element effective on deoxidization. However, MnS that is an Mn inclusion reduces corrosion resistance, and thus the Mn content is controlled to be more than 0% and not more than 10% in the present disclosure.

P: more than 0% and not more than 0.04%

Because P deteriorates not only corrosion resistance but also toughness, the P content is controlled to be more than 0% and not more than 0.04% in the present disclosure.

S: more than 0% and not more than 0.02%

S binds to Mn contained in a steel to form stable MnS, and the formed MnS serves as an origin of corrosion to deteriorate corrosion resistance, and thus it is preferable to control the S content as low as possible. In consideration thereof, the S content may be controlled to be more than 0% and not more than 0.02% in the present disclosure.

Cr: 15 to 34%

Cr is an element enhancing corrosion resistance. Cr is actively added to obtain corrosion resistance in a strongly acidic operating environment of a fuel cell. However, an excess of Cr may deteriorate toughness, and thus the Cr content is controlled from 15 to 34% in the present disclosure in consideration thereof Ni: 25% or less Ni is an element stabilizing an austenite phase and enhancing corrosion resistance. In addition, Ni is generally contained in more than a certain amount in austenitic stainless steels and ferritic-austenitic dual-phase stainless steels. However, an excess of Ni may deteriorate workability, and thus the Ni content is controlled to be 25% or less in the present disclosure in consideration thereof.

A lower limit of Ni is not particularly limited and Ni may be appropriately contained according to the steel type. For example, a lower limit of the Ni content in austenitic stainless steels or ferritic-austenitic dual-phase stainless steels may be 2.0% or more. For example, a lower limit of the Ni content in ferritic stainless steels may be less than 2.0%, preferably, 1.0% or less, more preferably, 0.01% or less.

In addition, the stainless steel according to an embodiment may include as optional alloying elements, if required, in percent by weight (wt %), at least one selected from more than 0.01% and not more than 1.5% of Cu, more than 0.01% and not more than 0.6% of V, 0.01 to 5.0% of Mo, 0.01 to 0.5% of Ti, and 0.01 to 0.4% of Nb, in addition to the above-described alloying elements. However, it is necessary to note that the compositions of the optional alloying elements is only intended to assist understanding of the present disclosure in more detail and are not intended to limit the scope of the present disclosure.

Cu: more than 0.01% and not more than 1.5%

Cu is an element enhancing corrosion resistance. However, when an excess of Cu is added, Cu is eluted to deteriorate performance of a fuel cell. Thus, the Cu content is controlled to be more than 0% and not more than 1.5% in the present disclosure in consideration thereof.

V: more than 0.01% and not more than 0.6%

V is an element enhancing the lifespan of a fuel cell by inhibiting elution of Fe in an operating environment of the fuel cell. However, an excess of V deteriorates toughness, and thus the V content is controlled to be more than 0.01% and not more than 0.6% in the present disclosure in consideration thereof.

Mo: 0.01 to 5.0%

Mo is an element enhancing corrosion resistance. However, an excess of Mo deteriorates workability, and thus the Mo content is controlled to be from 0.01 to 5.0%.

Ti: 0.01 to 0.5%, Nb: 0.01 to 0.4%

Ti and Nb bind to C and N contained in a steel to form a stable carbonitride and inhibit formation of a region in which Cr is locally depleted, thereby enhancing corrosion resistance. However, an excess of Ti and Nb deteriorates toughness, and thus the Ti content is controlled in the range of 0.01 to 0.5% and the Nb content is controlled in the range of 0.01 to 0.4% in the present disclosure in consideration thereof.

The remaining component of the composition of the present disclosure is iron (Fe). However, the composition may include unintended impurities inevitably incorporated from raw materials or surrounding environments, and thus addition of other alloy components is not excluded. The impurities are not specifically mentioned in the present disclosure, as they are known to any person skilled in the art of manufacturing.

A method of manufacturing a stainless steel having excellent surface electrical conductivity for a fuel cell separator according to the present disclosure is not particularly limited, as long as the value of the surface oxide atomic ratio (1) is controlled to 0.5 or less.

According to an embodiment of the present disclosure, the stainless steel having excellent surface electrical conductivity for a fuel cell separator may be manufactured by surface-treating a cold-rolled steel sheet prepared according to a common stainless steel-manufacturing method. The surface treatment according to an embodiment may be performed by two steps, and a primary surface treatment may include immersing the cold-rolled stainless steel sheet in a nonoxidizing acid solution or performing an electrolytic treatment after the immersing. The secondary surface treatment may include immersing the cold-rolled stainless steel sheet in an oxidizing acid solution.

The primary surface treatment according to an embodiment of the present disclosure may include immersing the cold-rolled stainless steel sheet in a nonoxidizing acid solution for 5 seconds or more, or performing an electrolytic treatment at a current density of 0.1 A/cm² for 5 seconds or more after the immersing. In this case, the nonoxidizing acid solution may be a 5 wt % or more hydrochloric acid (HCl) or sulfuric acid solution at 50° C. or higher.

The secondary surface treatment according to an embodiment of the present disclosure may include immersing the cold-rolled stainless steel sheet in an oxidizing acid solution for 5 seconds or more. In this case, the oxidizing acid solution may be a 5 wt % or more nitric acid solution at 50° C. or higher.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Steel types having the compositions of alloying elements shown in Table 1 were prepared as slabs by steel making and continuous casting. Then, the manufactured slabs were hot-rolled to a thickness of 4.5 mm at 1200° C. to obtain hot-rolled steel sheets. The hot-rolled steel sheets were repeatedly heated at 1050° C. and cold-rolled and annealed at 1000° C. to prepare 0.15 mm-thick cold-rolled steel sheets.

In Table 1 below, Steels 1 to 9 are inventive steels. Steels 1 to 3 are ferritic stainless steel, Steels 4 to 6 are austenitic stainless steels, Steels 7 to 9 are ferritic-austenitic dual-phase stainless steels. Steels 10 and 11 are comparative steels in which the Cr content is less than 15 wt %.

solution, as an oxidizing acid solution. As an example of the surface treatment shown in Table 2 for better understanding, the cold-rolled stainless steel sheet of Inventive Example 1 of Table 2 was immersed in an 8 wt % sulfuric acid solution at 50° C. for 5 seconds for the primary surface treatment (A), and then immersed in a 10 wt % nitric acid solution at 50° C. for 9 seconds for the secondary surface treatment (D).

The value of the surface oxide atomic ratio (1) of Table 2 is a value obtained using Expression (1) below, as a value obtained by measuring the surface of each of the stainless steels according to inventive examples and comparative examples by X-ray angle-resolved photoemission spectroscopy using an Al-Kα X-ray source under the condition where a take-off angle of photoelectrons is as shown in Table 2.

$$\frac{\text{sum of atomic concentrations (at\%)}}{\text{of metal elements in metal oxide (MO)}} \quad (1)$$
$$\overline{\text{sum of atomic concentrations (at\%)}}$$
$$\text{of metal elements in total oxides and hydroxides}$$

The value of the surface oxide atomic ratio (1) was measured using a method described below. First, analysis was conducted under the take-off angle conditions of Table 2 using the PHI Quantera II device, peaks were separated from the binding energy of the metal oxide (MO), the Cr oxide, the Cr hydroxide, the Fe oxide, and the Fe hydroxide using the CasaXPS software from the analysis results, and atomic concentrations were calculated using the same.

The 'sum of atomic concentrations (at %) of metal elements in metal oxide (MO)' used to obtain the value of the surface oxide atomic ratio (1) was obtained by separating peaks from the binding energy of the metal oxide (MO), and fitting the peaks on the spectrum of each metal (M). In this regard, the metal oxide (MO) includes a mixed oxide, M represents an alloying element other than Cr and Fe or a combination thereof in the matrix; and O represents oxygen.

The 'sum of atomic concentrations (at %) of metal elements in total oxides and hydroxides' in the value of the

TABLE 1

| Steel | Alloying element (wt %) | | | | | | | | | | | | |
|---|---|---|---|---|---|---|---|---|---|---|---|---|---|
| type | C | N | Si | Mn | P | S | Cr | Ni | Cu | V | Mo | Nb | Ti |
| Steel 1 | 0.01 | 0.01 | 0.2 | 0.3 | 0.009 | 0.008 | 15.8 | — | — | — | — | — | 0.15 |
| Steel 2 | 0.01 | 0.011 | 0.14 | 0.25 | 0.01 | 0.009 | 22 | — | — | — | 0.18 | 0.35 | 0.03 |
| Steel 3 | 0.008 | 0.012 | 0.11 | 0.15 | 0.03 | 0.004 | 30.2 | — | — | 0.32 | — | 0.18 | 0.11 |
| Steel 4 | 0.12 | 0.04 | 0.65 | 0.9 | 0.025 | 0.005 | 17 | 6.3 | 0.02 | — | — | — | 0.01 |
| Steel 5 | 0.02 | 0.05 | 0.5 | 1.12 | 0.02 | 0.002 | 16.4 | 10 | 0.2 | — | 2 | — | — |
| Steel 6 | 0.04 | 0.08 | 0.5 | 1.4 | 0.015 | 0.001 | 25.6 | 19.8 | 0.4 | — | 0.09 | — | — |
| Steel 7 | 0.028 | 0.25 | 0.7 | 3.1 | 0.01 | 0.001 | 20.1 | 0.92 | 0.84 | — | 0.01 | — | — |
| Steel 8 | 0.016 | 0.14 | 0.43 | 1.43 | 0.013 | 0.001 | 23.1 | 4.11 | 0.25 | — | 0.29 | — | — |
| Steel 9 | 0.015 | 0.28 | 0.34 | 0.82 | 0.012 | 0.001 | 25.2 | 6.3 | — | — | 3.78 | — | — |
| Steel 10 | 0.01 | 0.012 | 0.18 | 0.28 | 0.008 | 0.007 | 14.8 | — | — | — | — | — | 0.15 |
| Steel 11 | 0.10 | 0.035 | 0.45 | 0.8 | 0.015 | 0.005 | 13 | 9 | 0.15 | — | — | — | 0.1 |

The cold-rolled steel sheets manufactured according to Table 1 were surface-treated under surface treatment conditions shown in Table 2 below. Surface treatment was performed by primary and secondary surface treatments under the conditions A to H shown in Table 2. The primary surface treatment was performed by immersing the cold-rolled steel sheet in a sulfuric acid solution, as a nonoxidizing acid solution, or performing an electrolytic treatment after the immersing. The secondary surface treatment was performed by immersing the stainless steel in a nitric acid surface oxide atomic ratio (1) was calculated by adding the sum of atomic concentrations (at %) of Cr in the Cr oxide and the Cr hydroxide and the sum of atomic concentrations (at %) of Fe in the Fe oxide and the Fe hydroxide to the above-described 'sum of atomic concentrations (at %) of metal elements in metal oxide (MO)'.

The sum of atomic concentrations (at %) of Cr in the Cr oxide and the Cr hydroxide was calculated by separating peaks from the binding energy of the Cr oxide and the Cr hydroxide, and fitting the peaks on a Cr 2 p spectrum. The sum of atomic concentrations (at %) of Fe in the Fe oxide and the Fe hydroxide was calculated by separating peaks from the binding energy of the Fe oxide and the Fe hydroxide, and fitting the peaks on a Fe 2 p spectrum.

The bandgap energy of Table 2 refers to a bandgap energy of the surface oxide layer. The bandgap energy of the surface oxide layer was measured by using a current sensing atomic force microscope (Mode No. Keysight 9500). The stainless steels of the inventive examples and comparative examples were cut into a sample with a size of 1 cm×1 cm, and the bandgap energy was measured with a current tip mode while a bias applied by a load of 20 nN changes from –10 V to 10 V in a nitrogen atmosphere with a relative humidity of 18% such that the surface oxide layer is measured in an inactive state. A width of a region in which a current detected while the applied bias changes from –10 V to 10 V was "0" as the bandgap energy by measuring 5 times an area of 50 μm×50 μm in the sample. In this case, a silicon tip (Si tip) coated with platinum having a thickness of 30 nm was used as a tip.

TABLE 2

| | Steel type | Primary surface treatment | Secondary surface treatment | Take-off angle condition of photoelectron | | | Bandgap energy (eV) |
| | | | | Value (1) at 12° | Value (1) at 44° | Value (1) at 85° | |
|---|---|---|---|---|---|---|---|
| Inventive Example 1 | Steel 1 | A | D | 0.1 | 0.12 | 0.22 | 0 |
| Inventive Example 2 | Steel 1 | B | D | 0.02 | 0.08 | 0.09 | 0 |
| Comparative Example 1 | Steel 1 | E | D | 0.55 | 0.61 | 0.62 | 2.9 |
| Inventive Example 3 | Steel 2 | B | D | 0.12 | 0.11 | 0.12 | 0.3 |
| Inventive Example 4 | Steel 2 | A | D | 0.22 | 0.1 | 0.21 | 0.5 |
| Comparative Example 2 | Steel 2 | F | D | 0.51 | 0.53 | 0.55 | 3.5 |
| Inventive Example 5 | Steel 3 | B | D | 0.4 | 0.45 | 0.5 | 1 |
| Inventive Example 6 | Steel 3 | C | D | 0.1 | 0.11 | 0.12 | 0 |
| Comparative Example 3 | Steel 3 | F | — | 0.55 | 0.55 | 0.65 | 3.2 |
| Inventive Example 7 | Steel 4 | A | D | 0.11 | 0.23 | 0.45 | 0.2 |
| Inventive Example 8 | Steel 4 | C | D | 0.11 | 0.12 | 0.13 | 0.22 |
| Comparative Example 4 | Steel 4 | — | D | 0.51 | 0.52 | 0.53 | 2.9 |
| Inventive Example 9 | Steel 5 | B | D | 0.23 | 0.24 | 0.22 | 0.23 |
| Inventive Example 10 | Steel 5 | B | D | 0.45 | 0.42 | 0.39 | 1.8 |
| Comparative Example 5 | Steel 5 | F | H | 0.6 | 0.58 | 0.59 | 4.5 |
| Inventive Example 11 | Steel 6 | A | D | 0.12 | 0.11 | 0.12 | 0 |
| Inventive Example 12 | Steel 6 | B | D | 0.34 | 0.32 | 0.33 | 0 |
| Comparative Example 6 | Steel 6 | G | — | 0.52 | 0.52 | 0.55 | 6.5 |
| Inventive Example 13 | Steel 7 | C | D | 0.35 | 0.32 | 0.33 | 0.1 |
| Inventive Example 14 | Steel 7 | A | D | 0.38 | 0.4 | 0.35 | 0 |
| Comparative Example 7 | Steel 7 | F | — | 0.55 | 0.8 | 0.85 | 7.6 |
| Inventive Example 15 | Steel 8 | A | D | 0.23 | 0.33 | 0.44 | 0 |
| Inventive Example 16 | Steel 8 | C | D | 0.12 | 0.09 | 0.08 | 0 |
| Comparative Example 8 | Steel 8 | G | H | 0.65 | 0.66 | 0.78 | 6.6 |
| Inventive Example 17 | Steel 9 | A | D | 0.31 | 0.32 | 0.29 | 1.2 |
| Inventive Example 18 | Steel 9 | B | D | 0.41 | 0.43 | 0.49 | 1.9 |
| Comparative Example 9 | Steel 9 | — | H | 0.55 | 0.55 | 0.6 | 3.3 |
| Comparative Example 10 | Steel 10 | E | H | 0.6 | 0.7 | 0.81 | 4.5 |
| Comparative Example 11 | Steel 10 | E | H | 0.55 | 0.52 | 0.53 | 3.2 |

TABLE 2-continued

| | Steel type | Primary surface treatment | Secondary surface treatment | Take-off angle condition of photoelectron | | | Bandgap energy (eV) |
|---|---|---|---|---|---|---|---|
| | | | | Value (1) at 12° | Value (1) at 44° | Value (1) at 85° | |
| Comparative Example 12 | Steel 11 | F | — | 0.6 | 0.65 | 0.77 | 3.4 |
| Comparative Example 13 | Steel 11 | A | D | 0.55 | 0.52 | 0.53 | 2.5 |

A: immersing in an 8 wt % sulfuric acid solution at 50° C. for 5 seconds,
B: immersing in a 10 wt % sulfuric acid solution at 50° C. for 6 seconds,
C: immersing in a 10 wt % sulfuric acid solution at 50° C., followed by electrolytic treatment at 0.2 A/cm² for 10 seconds,
D: immersing in a 10 wt % nitric acid solution at 50° C. for 9 seconds,
E: immersing in an 8 wt % sulfuric acid solution at 50° C. for 3 seconds,
F: immersing in a 10 wt % sulfuric acid solution at 50° C. for 3 seconds,
G: immersing in a 10 wt % sulfuric acid solution at 50° C., followed by electrolytic treatment at 0.2 A/cm² for 4 second,
H: immersing in a 10 wt % nitric an acid solution at 50° C. for 3 seconds Hereinafter, stainless steels according to the inventive examples and comparative examples were comparatively evaluated referring to Table 2. Referring to the results of Table 2, Inventive Examples 1 to 18 satisfied the value of the surface oxide atomic ratio (1) of 0.5 or less under surface treatment conditions according to the present disclosure, i.e., under the condition where the take-off angle of photoelectrons was from 12° to 85°, and thus the bandgap energy of the surface oxide layer was not more than 2 eV. Furthermore, referring to Inventive Examples 1, 2, 6, 11, 12, 14, 15, and 16, the value of the surface oxide atomic ratio (1) may be not more than 0.44 for formation of an ohmic contact between the surface oxide layer and the matrix by adjusting the bandgap energy of the surface oxide layer to 0 eV.

In Comparative Examples 1 and 2, the primary surface treatment was performed for a too short period of time of 3 seconds, and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 3, the primary surface treatment was performed for a too short period of time of 3 seconds and the secondary surface treatment was not performed. Also, the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 4, the primary surface treatment was not performed and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 5, the primary and secondary surface treatments were performed for a too short period of time of 3 seconds, and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Examples 6 and 7, the primary surface treatment was performed for a too short period of time of 3 seconds, and secondary surface treatment was not performed. Also, the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 8, the primary and secondary surface treatments were performed for a too short period of time of 3 seconds, and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 9, the primary surface treatment was not performed, and the secondary surface treatment was performed for a too short period of time of 3 seconds. Also, the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Examples 10 and 11, the primary and secondary surface treatments were performed for a too short period of time of 3 seconds. Also, the Cr content was less than 15 wt %, and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 12, the primary surface treatment was not performed, and the secondary surface treatment were performed for a too short period of time of 3 seconds. Also, the Cr content was less than 15 wt %, and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

In Comparative Example 13, although the primary and secondary surface treatments were performed for 5 seconds or more, the Cr content was less than 15 wt % and the value of the surface oxide atomic ratio (1) exceeded 0.5 under the condition where the take-off angle of photoelectrons was 12°, 44°, and 85°. As a result, the bandgap energy of the surface oxide layer exceeded 2 eV.

FIGS. 1 and 2 are graphs illustrating relationship between the bandgap energy and the value of the surface oxide atomic ratio (1) based on the results shown in Table 2. The take-off angles of photoelectrons were 12° and 85°, respectively in FIGS. 1A and 1B. The horizontal axis of FIGS. 1A and 1B indicates the value of the surface oxide atomic ratio (1), and the vertical axis indicates the bandgap energy (eV).

Referring to FIGS. 1A and 1B, it may be confirmed that the bandgap energy is 2 eV or less when the value of the surface oxide atomic ratio (1) is less than 0.5, which is a reference point. When the value of the surface oxide atomic ratio (1) exceeds 0.5, the bandgap energy rapidly increases, thereby exceeding 2 eV. Referring to this, it may be seen that the bandgap energy may be adjusted to 2 eV or less by controlling the value of the surface oxide atomic ratio (1) to 0.5 or less. In addition, referring to FIGS. 1A and 1B, it may be confirmed that the value of the surface oxide atomic ratio (1) may preferably be adjusted to 0.44 or less to obtain a bandgap energy of 0 eV.

In addition, regions marked by dashed lines in FIGS. 1A and 1B indicate regions in which the value of the surface oxide atomic ratio (1) is not more than 0.5 and the bandgap energy is not more than 2 eV. Referring to FIGS. 1A and 1B, all of the inventive examples are included in the regions marked by the dashed lines in FIGS. 1A and 1B, and thus it may be seen that a stainless steel having excellent surface electrical conductivity for a fuel cell separator and having a bandgap energy of 2 eV or less may be provided by controlling the value of the surface oxide atomic ratio (1) to 0.5 or less.

Based on the results of the above-described examples, the present disclosure may provide a stainless steel having excellent surface electrical conductivity for a fuel cell separator and a manufacturing method thereof, the stainless steel applicable to materials for electrical contacts and materials for fuel cell separators by making the surface oxide layer, which is formed on the surface of the stainless steel and has semiconductor properties, into a conductor.

In addition, a stainless steel having excellent surface electrical conductivity for a fuel cell separator and having a bandgap energy of a surface oxide layer of 2 eV or less may be provided by controlling the value of the surface oxide atomic ratio (1) to 0.5 or less, measured on the surface of the stainless steel by X-ray angle-resolved photoemission spectroscopy using an Al-Kα X-ray source under the condition where a take-off angle of photoelectrons is from 12° to 85°.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The stainless steel having excellent surface electrical conductivity according to the present disclosure may be applied to fuel cell separators, and the like.

The invention claimed is:

1. A stainless steel for a fuel cell separator, comprising:
 a surface oxide layer having a bandgap energy of 2 eV or less,
 wherein a value of the following surface oxide atomic ratio (1) is 0.44 or less, as measured on a surface of the stainless steel containing 15 wt % or more of Cr by X-ray angle-resolved photoemission spectroscopy using an Al-Kα X-ray source under the condition where a take-off angle of photoelectrons is from 12° to 85°, $$\frac{\text{sum of atomic concentrations (at \%)}}{\text{of metal elements in metal oxide (MO)}} \quad (1)$$
$$\frac{}{\text{sum of atomic concentrations (at \%)}}{\text{of metal elements in total oxides and hydroxides}}$$

wherein the metal oxide (MO) includes a mixed oxide: M represents an alloying element other than Cr and Fe or a combination thereof in the matrix; and O represents oxygen, and
 the total oxides and hydroxides comprise a Cr oxide, a Cr hydroxide, an Fe oxide, an Fe hydroxide, and the metal oxide (MO).

2. The stainless steel according to claim 1, wherein the surface oxide layer of the stainless steel forms an ohmic contact with the matrix.

3. A method for manufacturing the stainless steel according to claim 1, the method comprising:
 a primary surface treatment performed by immersing a cold-rolled stainless steel sheet in a nonoxidizing acid solution, or conducting an electrolytic treatment after the immersing, and
 a secondary surface treatment performed by immersing the cold-rolled stainless steel sheet in an oxidizing acid solution.

4. The method according to claim 3, wherein the primary surface treatment comprises immersing the cold-rolled stainless steel sheet in the nonoxidizing acid solution for 5 seconds or more, or performing an electrolytic treatment with a current density of 0.1 A/cm$^2$ or more for 5 seconds or more after the immersing, and
 the nonoxidizing acid solution is a 5 wt % or more hydrochloric acid (HCl) or sulfuric acid solution at 50° C. or higher.

5. The method according to claim 3, wherein the secondary surface treatment comprises immersing the cold-rolled stainless steel sheet in the oxidizing acid solution for 5 seconds or more, and
 the oxidizing acid solution is a 5 wt % or more nitric acid solution at 50° C. or higher.

6. The stainless steel according to claim 1, wherein the value of the surface oxide atomic ratio (1) is 0.39 or less.

* * * * *